(12) United States Patent
Kralles et al.

(10) Patent No.: US 11,231,509 B2
(45) Date of Patent: Jan. 25, 2022

(54) DIGITAL RADIOGRAPHIC DETECTOR FRONT COVER BONDING

(71) Applicant: CARESTREAM HEALTH, INC., Rochester, NY (US)

(72) Inventors: Christopher J. Kralles, Rochester, NY (US); Nathan Kalpin, Brockport, NY (US); Steven D. Daniels, Churchville, NY (US); Robert J. Stanchus, Wolcott, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 16/986,440

(22) Filed: Aug. 6, 2020

(65) Prior Publication Data

US 2021/0041583 A1    Feb. 11, 2021

Related U.S. Application Data

(60) Provisional application No. 62/884,186, filed on Aug. 8, 2019.

(51) Int. Cl.
*G01T 1/20* (2006.01)
*H04N 5/32* (2006.01)

(52) U.S. Cl.
CPC .......... *G01T 1/2018* (2013.01); *G01T 1/2006* (2013.01); *H04N 5/32* (2013.01)

(58) Field of Classification Search
None
See application file for complete search history.

(56) References Cited

U.S. PATENT DOCUMENTS

2005/0241436 A1* 11/2005 Leimann ............... F16H 57/031
                                                      74/606 R
2008/0304246 A1* 12/2008 Utschig .................. A61B 6/102
                                                       361/818
2020/0405251 A1* 12/2020 Long .................... A61B 6/5247

* cited by examiner

*Primary Examiner* — Edwin C Gunberg

(57) ABSTRACT

A DR detector is formed from a housing with a cover attached to the housing. Shaped gaps formed in the housing and/or cover include a bonding agent or adhesive therein to fix the cover to the housing. Other attachment means such as screws or pins may be used instead of, or in combination with, the bonding agent.

14 Claims, 9 Drawing Sheets

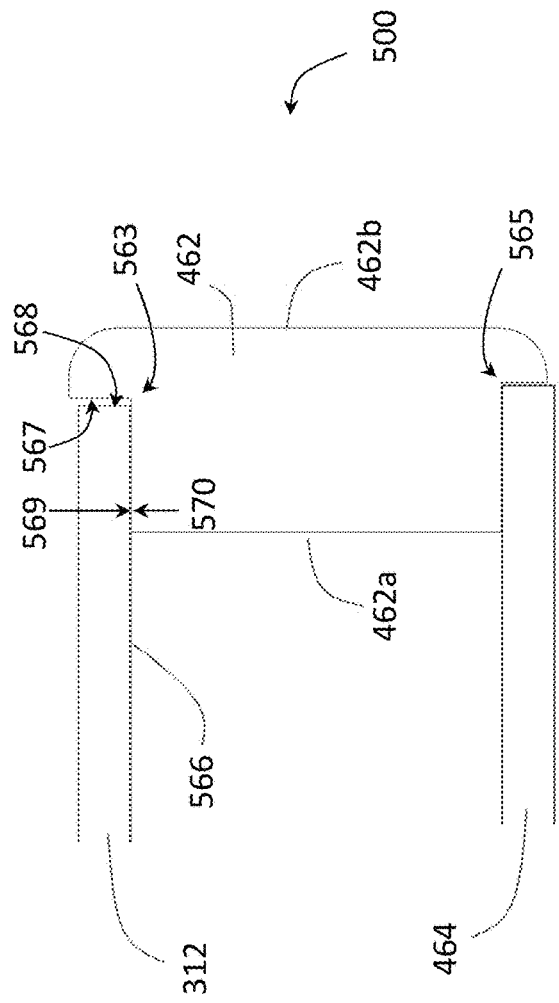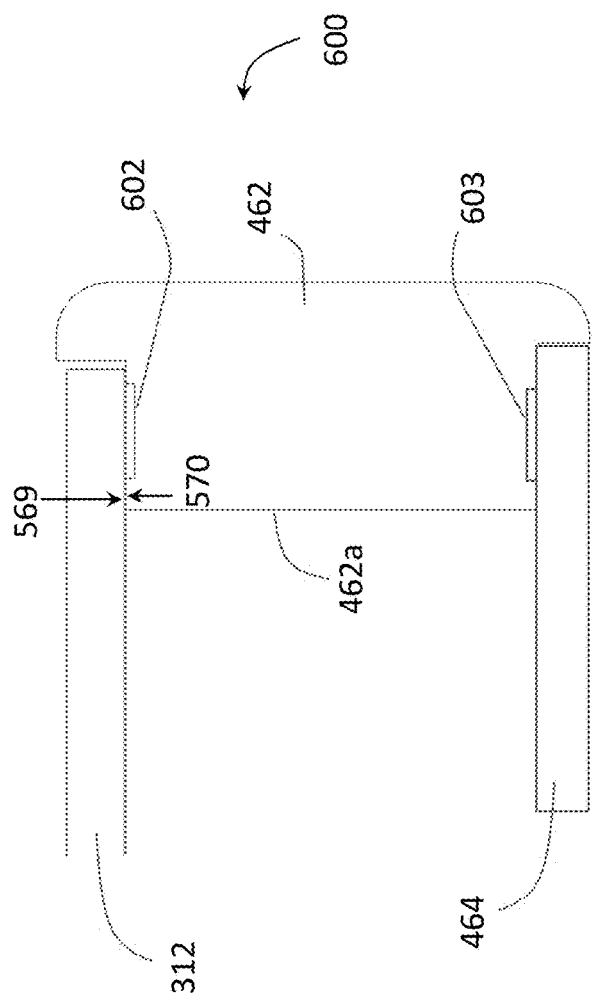

DIGITAL RADIOGRAPHIC DETECTOR FRONT COVER BONDING

CROSS REFERENCE TO RELATED APPLICATIONS

This application claims priority to U.S. Patent Application Ser. No. 62/884,186, filed Aug. 8, 2019, in the name of Kralles, et al., and entitled DIGITAL RADIOGRAPHIC DETECTOR FRONT COVER BONDING, which is hereby incorporated by reference herein in its entirety.

BACKGROUND OF THE INVENTION

The subject matter disclosed herein relates to digital radiographic detectors and methods of assembling a housing therefor.

FIG. 1 is a perspective view of a digital radiographic (DR) imaging system 10 that may include a generally curved or planar DR detector 40 (shown in a planar embodiment and without a housing for clarity of description), an x-ray source 14 configured to generate radiographic energy (x-ray radiation), and a digital monitor, or electronic display, 26 configured to display images captured by the DR detector 40, according to one embodiment. The DR detector 40 may include a two dimensional array 12 of detector cells 22 (photosensors), arranged in electronically addressable rows and columns. The DR detector 40 may be positioned to receive x-rays 16 passing through a subject 20 during a radiographic energy exposure, or radiographic energy pulse, emitted by the x-ray source 14. As shown in FIG. 1, the radiographic imaging system 10 may use an x-ray source 14 that emits collimated x-rays 16, e.g. an x-ray beam, selectively aimed at and passing through a preselected region 18 of the subject 20. The x-ray beam 16 may be attenuated by varying degrees along its plurality of rays according to the internal structure of the subject 20, which attenuated rays are detected by the array 12 of photosensitive detector cells 22. The curved or planar DR detector 40 is positioned, as much as possible, in a perpendicular relation to a substantially central ray 17 of the plurality of rays 16 emitted by the x-ray source 14. In a curved array embodiment, the source 14 may be centrally positioned such that a larger percentage, or all, of the photosensitive detector cells are positioned perpendicular to incoming x-rays from the centrally positioned source 14. The array 12 of individual photosensitive cells (pixels) 22 may be electronically addressed (scanned) by their position according to column and row. As used herein, the terms "column" and "row" refer to the vertical and horizontal arrangement of the photosensor cells 22 and, for clarity of description, it will be assumed that the rows extend horizontally and the columns extend vertically. However, the orientation of the columns and rows is arbitrary and does not limit the scope of any embodiments disclosed herein. Furthermore, the term "subject" may be illustrated as a human patient in the description of FIG. 1, however, a subject of a DR imaging system, as the term is used herein, may be a human, an animal, an inanimate object, or a portion thereof.

In one exemplary embodiment, the rows of photosensitive cells 22 may be scanned one or more at a time by electronic scanning circuit 28 so that the exposure data from the array 12 may be transmitted to electronic read-out circuit 30. Each photosensitive cell 22 may independently store a charge proportional to an intensity, or energy level, of the attenuated radiographic radiation, or x-rays, received and absorbed in the cell. Thus, each photosensitive cell, when read-out, provides information defining a pixel of a radiographic image 24, e.g. a brightness level or an amount of energy absorbed by the pixel, that may be digitally decoded by image processing electronics 34 and transmitted to be displayed by the digital monitor 26 for viewing by a user. An electronic bias circuit 32 is electrically connected to the two-dimensional detector array 12 to provide a bias voltage to each of the photosensitive cells 22.

Each of the bias circuit 32, the scanning circuit 28, and the read-out circuit 30, may communicate with an acquisition control and image processing unit 34 over a connected cable 33 (wired), or the DR detector 40 and the acquisition control and image processing unit 34 may be equipped with a wireless transmitter and receiver to transmit radiographic image data wirelessly 35 to the acquisition control and image processing unit 34. The acquisition control and image processing unit 34 may include a processor and electronic memory (not shown) to control operations of the DR detector 40 as described herein, including control of circuits 28, 30, and 32, for example, by use of programmed instructions, and to store and process image data. The acquisition control and image processing unit 34 may also be used to control activation of the x-ray source 14 during a radiographic exposure, controlling an x-ray tube electric current magnitude, and thus the fluence of x-rays in x-ray beam 16, and/or the x-ray tube voltage, and thus the energy level of the x-rays in x-ray beam 16. A portion or all of the acquisition control and image processing unit 34 functions may reside in the detector 40 in an on-board processing system 36 which may include a processor and electronic memory to control operations of the DR detector 40 as described herein, including control of circuits 28, 30, and 32, by use of programmed instructions, and to store and process image data similar to the functions of standalone acquisition control and image processing system 34. The image processing system may perform image acquisition and image disposition functions as described herein. The image processing system 36 may control image transmission and image processing and image correction on board the detector 40 based on instructions or other commands transmitted from the acquisition control and image processing unit 34, and transmit corrected digital image data therefrom. Alternatively, acquisition control and image processing unit 34 may receive raw image data from the detector 40 and process the image data and store it, or it may store raw unprocessed image data in local memory, or in remotely accessible memory.

With regard to a direct detection embodiment of DR detector 40, the photosensitive cells 22 may each include a sensing element sensitive to x-rays, i.e. it absorbs x-rays and generates an amount of charge carriers in proportion to a magnitude of the absorbed x-ray energy. A switching element may be configured to be selectively activated to read out the charge level of a corresponding x-ray sensing element. With regard to an indirect detection embodiment of DR detector 40, photosensitive cells 22 may each include a sensing element sensitive to light rays in the visible spectrum, i.e. it absorbs light rays and generates an amount of charge carriers in proportion to a magnitude of the absorbed light energy, and a switching element that is selectively activated to read the charge level of the corresponding sensing element. A scintillator, or wavelength converter, may be disposed over the light sensitive sensing elements to convert incident x-ray radiographic energy to visible light energy. Thus, in the embodiments disclosed herein, it should be noted that the DR detector 40 (or DR detector 300 in FIG. 3 or DR detector 400 in FIG. 4A) may include an indirect or direct type of DR detector.

Examples of sensing elements used in sensing array 12 include various types of photoelectric conversion devices (e.g., photosensors) such as photodiodes (P-N or PIN diodes), photo-capacitors (MIS), photo-transistors or photoconductors. Examples of switching elements used for signal read-out include a-Si TFTs, oxide TFTs, MOS transistors, bipolar transistors and other p-n junction components.

FIG. 2 is a schematic diagram 240 of a portion of a two-dimensional array 12 for a DR detector 40. The array of photosensor cells 212, whose operation may be consistent with the photosensor array 12 described above, may include a number of hydrogenated amorphous silicon (a-Si:H) n-i-p photodiodes 270 and thin film transistors (TFTs) 271 formed as field effect transistors (FETs) each having gate (G), source (S), and drain (D) terminals. In embodiments of DR detector 40 disclosed, herein, such as a multilayer DR detector (400 of FIG. 4A), the two-dimensional array of photosensor cells 12 may be formed in a device layer that abuts adjacent layers of the DR detector structure, which adjacent layers may include a rigid glass layer or a flexible polyimide layer or a layer including carbon fiber without any adjacent rigid layers. A plurality of gate driver circuits 228 may be electrically connected to a plurality of gate lines 283 which control a voltage applied to the gates of TFTs 271, a plurality of readout circuits 230 may be electrically connected to data lines 284, and a plurality of bias lines 285 may be electrically connected to a bias line bus or a variable bias reference voltage line 232 which controls a voltage applied to the photodiodes 270. Charge amplifiers 286 may be electrically connected to the data lines 284 to receive signals therefrom. Outputs from the charge amplifiers 286 may be electrically connected to a multiplexer 287, such as an analog multiplexer, then to an analog-to-digital converter (ADC) 288, or they may be directly connected to the ADC, to stream out the digital radiographic image data at desired rates. In one embodiment, the schematic diagram of FIG. 2 may represent a portion of a DR detector 40 such as an a-Si:H based indirect flat panel, curved panel, or flexible panel imager.

Incident x-rays, or x-ray photons, 16 are converted to optical photons, or light rays, by a scintillator, which light rays are subsequently converted to electron-hole pairs, or charges, upon impacting the a-Si:H n-i-p photodiodes 270. In one embodiment, an exemplary detector cell 222, which may be equivalently referred to herein as a pixel, may include a photodiode 270 having its anode electrically connected to a bias line 285 and its cathode electrically connected to the drain (D) of TFT 271. The bias reference voltage line 232 can control a bias voltage of the photodiodes 270 at each of the detector cells 222. The charge capacity of each of the photodiodes 270 is a function of its bias voltage and its capacitance. In general, a reverse bias voltage, e.g. a negative voltage, may be applied to the bias lines 285 to create an electric field (and hence a depletion region) across the pn junction of each of the photodiodes 270 to enhance its collection efficiency for the charges generated by incident light rays. The image signal represented by the array of photosensor cells 212 may be integrated by the photodiodes while their associated TFTs 271 are held in a non-conducting (off) state, for example, by maintaining the gate lines 283 at a negative voltage via the gate driver circuits 228. The photosensor cell array 212 may be read out by sequentially switching rows of the TFTs 271 to a conducting (on) state by means of the gate driver circuits 228. When a row of the pixels 22 is switched to a conducting state, for example by applying a positive voltage to the corresponding gate line 283, collected charge from the photodiode in those pixels may be transferred along data lines 284 and integrated by the external charge amplifier circuits 286. The row may then be switched back to a non-conducting state, and the process is repeated for each row until the entire array of photosensor cells 212 has been read out. The integrated signal outputs are transferred from the external charge amplifiers 286 to an analog-to-digital converter (ADC) 288 using a parallel-to-serial converter, such as multiplexer 287 which together comprise read-out circuit 230.

This digital image information may be subsequently processed by image processing system 34 to yield a digital image which may then be digitally stored and immediately displayed on monitor 26, or it may be displayed at a later time by accessing the digital electronic memory containing the stored image. The flat panel DR detector 40 having an imaging array as described with reference to FIG. 2 is capable of both single-shot (e.g., static, radiographic) and continuous (e.g., fluoroscopic) image acquisition.

FIG. 3 shows a perspective view of an exemplary prior art generally rectangular, planar, portable wireless DR detector 300 according to an embodiment of DR detector 40 disclosed herein. The DR detector 300 may include a flexible substrate to allow the DR detector to capture radiographic images in a curved orientation. The flexible substrate may be fabricated in a permanent curved orientation, or it may remain flexible throughout its life to provide an adjustable curvature in two or three dimensions, as desired. The DR detector 300 may include a similarly flexible housing sidewall portion 314 that surrounds a multilayer structure 463 (FIG. 4A) comprising a flexible photosensor array portion 22 of the DR detector 300. The housing sidewall portion 314 of the DR detector 300 may include a continuous, rigid or flexible, x-ray opaque material or, as used synonymously herein a radio-opaque material, surrounding an interior volume of the DR detector 300. The housing sidewall portion 314 may include four flexible edges 318, extending between the top side 321 and the bottom side 322, and arranged substantially orthogonally in relation to the top and bottom sides 321, 322. The bottom side 322 may be continuous with the four edges and disposed opposite the top side 321 of the DR detector 300. The top side 321 comprises a top cover 312 attached to the housing sidewall portion 314 which substantially encloses the multilayer structure 463 in the interior volume of the DR detector 300. The top cover 312 may be attached to the housing sidewall 314 to form a seal therebetween, and be made of a material that passes x-rays 16 without significant attenuation thereof, i.e., an x-ray transmissive material or, as used synonymously herein, a radiolucent material, such as a carbon fiber plastic, polymeric, or other plastic based material.

With reference to the embodiment of FIG. 4A, there is illustrated in schematic form a cross-section view of an exemplary DR detector embodiment 400 taken along section 4-4 of the DR detector 300 (FIG. 3). For spatial reference purposes, one major surface of the DR detector 400 may be referred to as the top side 451 and a second major surface may be referred to as the bottom side 452, as used herein. The multilayer structure 463 may be disposed within the interior volume 450 enclosed by the housing 314 and top cover 312 and may include a flexible curved or planar scintillator layer 404 over a curved or planar two-dimensional imaging sensor array 12 shown schematically as the device layer 402. The scintillator layer 404 may be directly under (e.g., directly connected to) the substantially planar top cover 312, and the imaging array 402 may be directly under the scintillator 404. Alternatively, a flexible layer 406 may be positioned between the scintillator layer 404 and the top cover 312 as part of the multilayer structure 463 to allow adjustable curvature of the multilayer structure 463 and/or to provide shock absorption. The flexible layer 406 may be selected to provide an amount of flexible support for both the top cover 312 and the scintillator 404, and may comprise a foam rubber type of material. The layers just described comprising the multilayer structure 463 each may generally be formed in a rectangular shape and defined by edges formed orthogonally and disposed in parallel with an interior side of the edges 318 of the housing 314, as described in reference to FIG. 3.

A substrate layer 420 may be disposed under the imaging array 402, such as a rigid glass layer, in one embodiment, or flexible substrate comprising polyimide or carbon fiber upon which the array of photosensors 402 may be formed to allow adjustable curvature of the array, and may comprise another layer of the multilayer structure 463. Under the substrate layer 420 a radio-opaque shield layer 418 may be used as an x-ray blocking layer to help prevent scattering of x-rays passing through the substrate layer 420 as well as to block x-rays reflected from other surfaces in the interior volume 450. Readout electronics, including the scanning circuit 28, the read-out circuit 30, the bias circuit 32, and processing system 36 (all in FIG. 1) may be formed adjacent the imaging array 402 or, as shown, may be disposed below frame support member 416 in the form of integrated circuits (ICs) electrically connected to printed circuit boards 424, 425. The imaging array 402 may be electrically connected to the readout electronics 424 (ICs) over a flexible connector 428 which may comprise a plurality of flexible, sealed conductors known as chip-on-film (COF) connectors.

X-ray flux may pass through the radiolucent top panel cover 312, in the direction represented by an exemplary x-ray beam 16, and impinge upon scintillator 404 where stimulation by the high-energy x-rays 16, or photons, causes the scintillator 404 to emit lower energy photons as visible light rays which are then received in the photosensors of imaging array 402. The frame support member 416 may connect the multilayer structure 463 to the housing 314 and may further operate as a shock absorber by disposing elastic pads (not shown) between the frame support beams 422 and the housing 314. Fasteners 410 may be used to attach the top cover 312 to the housing 314 and create a seal therebetween in the region 430 where they come into contact. In one embodiment, an external bumper 412 may be attached along the edges 318 of the DR detector 400 to provide additional shock-absorption.

The discussion above is merely provided for general background information and is not intended to be used as an aid in determining the scope of the claimed subject matter.

BRIEF DESCRIPTION OF THE INVENTION

A DR detector is formed from a housing with a cover attached to the housing. Shaped gaps formed in the housing and/or cover include a bonding agent or adhesive therein to fix the cover to the housing. Other attachment means such as screws or pins may be used instead of, or in combination with, the bonding agent.

In one embodiment, a DR detector includes a frame or housing, a cover attached to the frame or housing, and shaped gaps formed in the frame or housing and/or the cover wherein a bonding agent or adhesive is disposed therein to secure the cover to the housing or frame.

In one embodiment, a DR detector includes a frame having a plurality of screw holes. A cover having a plurality of openings therethrough is aligned with the screw holes and a plurality of screws disposed through the openings and screwed into the screw holes secure the cover to the frame.

In one embodiment, a DR detector includes a frame having a plurality of pin holes formed partially therethrough. A cover having a plurality of openings therethrough is aligned with the pin holes. A plurality of pins are disposed through the openings and into the pin holes for securing the cover to the frame.

The summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings below are intended to be drawn neither to any precise scale with respect to relative size, angular relationship, relative position, timing relationship, nor to any combinational relationship with respect to interchangeability, substitution, or representation of a required implementation, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 5 is an exemplary schematic diagram showing ne embodiment of a DR detector housing assembly;

FIG. 6 is an exemplary schematic diagram showing another embodiment of a DR detector housing assembly;

DETAILED DESCRIPTION OF THE INVENTION

Figure 1:
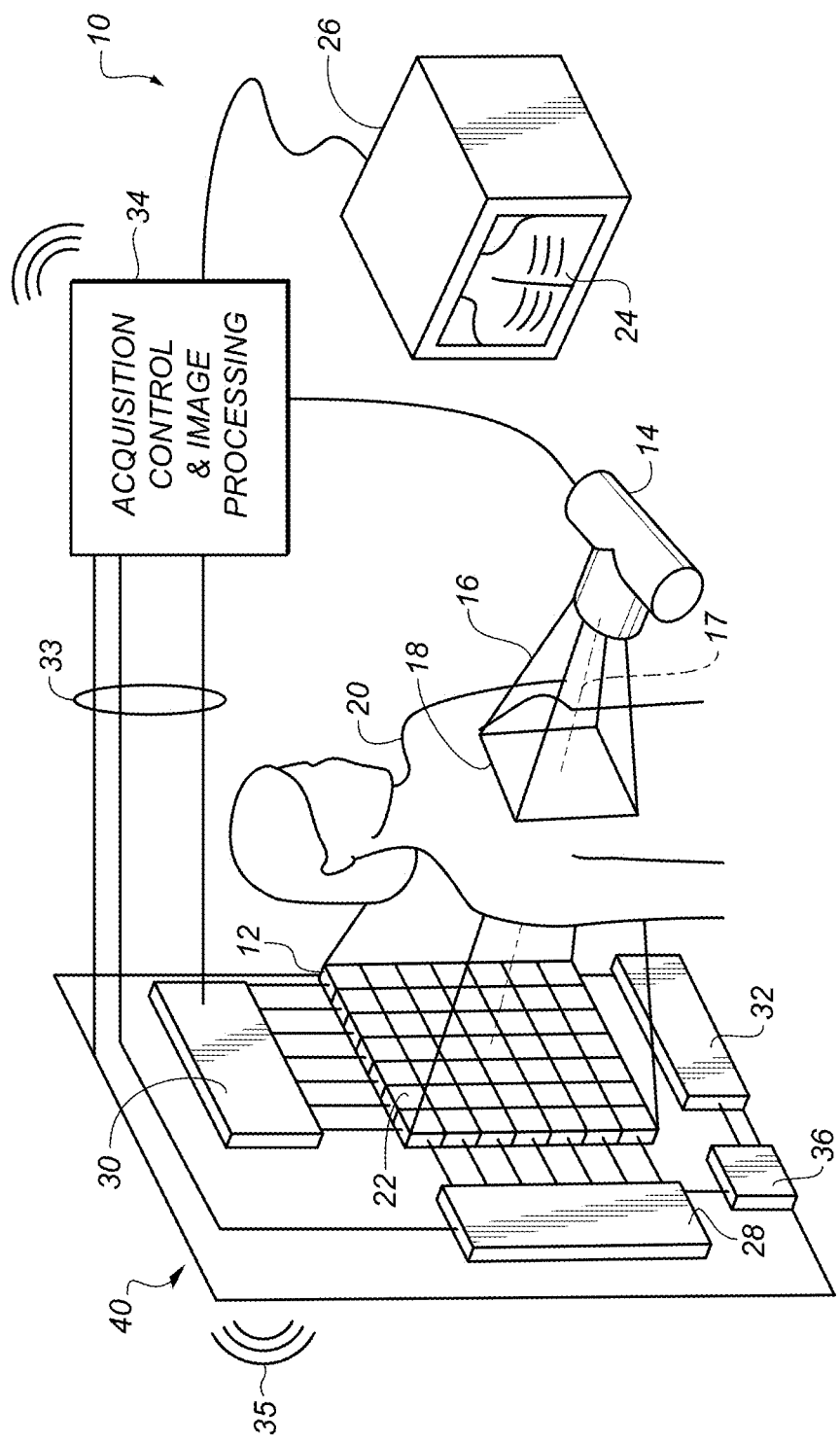
FIG. 1 is a schematic perspective view of an exemplary x-ray system.
Figure 2:
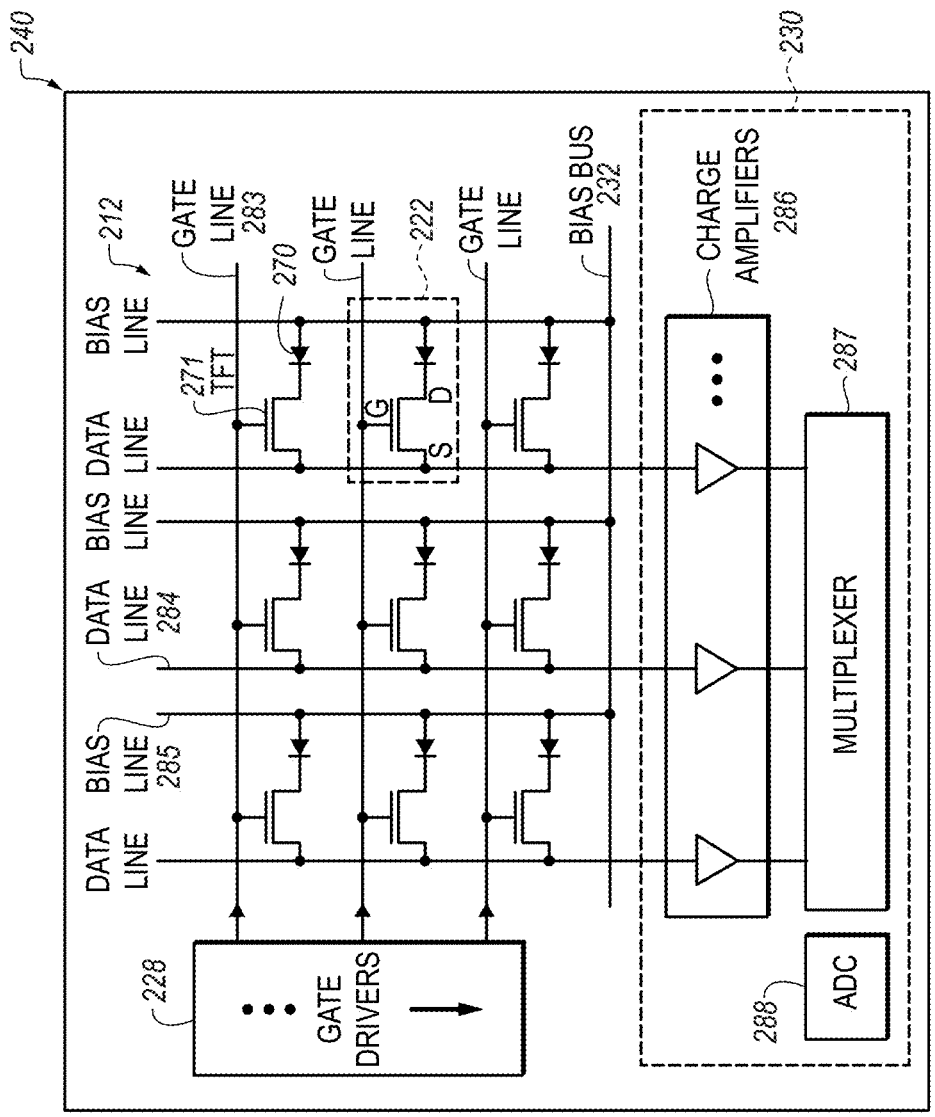
FIG. 2 is a schematic diagram of a photosensor array in a radiographic detector.
Figure 3:
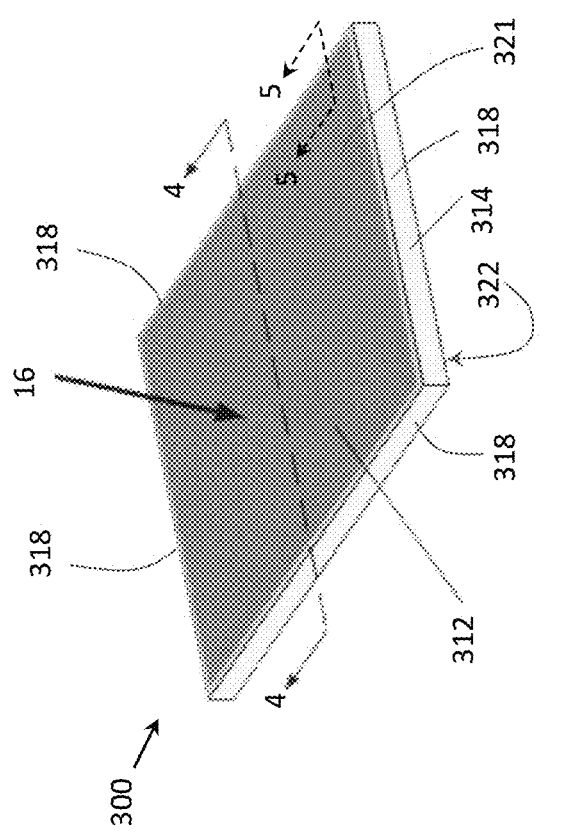
FIG. 3 is a perspective diagram of an exemplary DR detector.
Figure 4A:
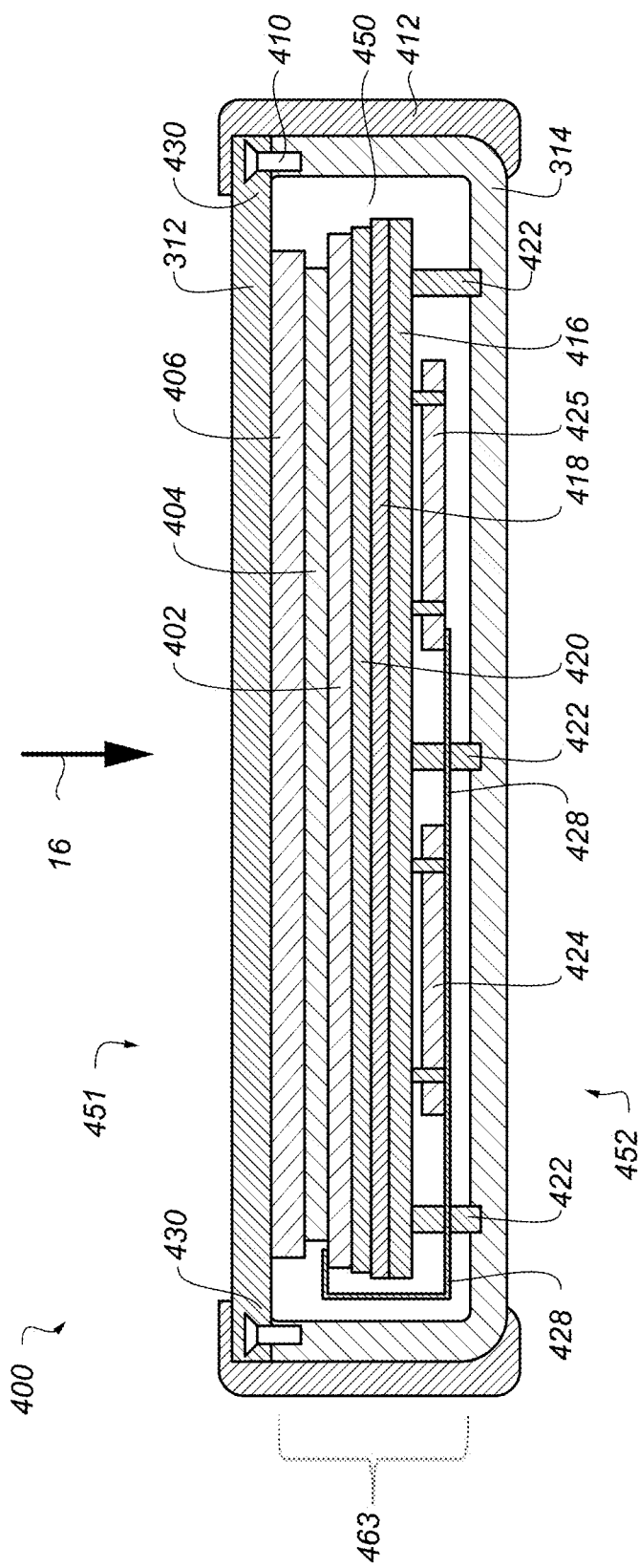
FIGS. 4A-B are cross section diagrams of exemplary DR detectors.
Figure 4B:
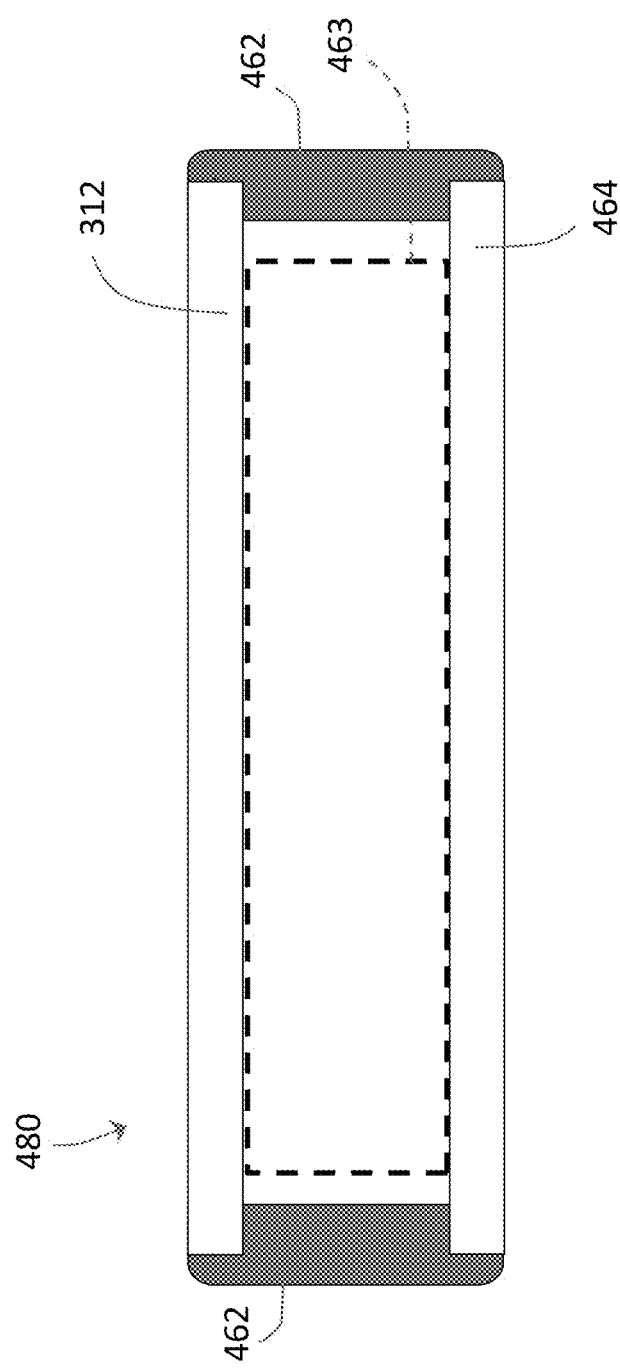

With reference to the embodiment of FIG. 4B, there is illustrated in schematic form a cross-section view of another exemplary DR detector embodiment 480 taken along section 4-4 of the DR detector 300 (FIG. 3). Details of the multilayer structure 463, as described in relation to FIG. 4A, will be omitted to avoid repetition and for ease of description. In the embodiment of FIG. 4B, the housing sidewall portion 314, of FIGS. 3 and 4A, is formed as a rigid sidewall member, or frame, 462 attached to top cover 312 and bottom cover 464. These three parts form the housing portion of the DR detector embodiment 480 shown in FIG. 4B. The top cover 312 may be made from a carbon fiber material, including a carbon fiber plastic composite, or other carbon fiber formulation, or even another radiolucent material. As used herein, the general term "carbon fiber" will be used to include various carbon fiber formulations. The bottom cover 464 may include aluminum having a thickness from about 1 mm to about 5 mm. The frame 462 may be made from aluminum. As before, the multilayer structure 463 may be disposed within the interior volume enclosed by the frame 462, top cover 312 and bottom cover 464, and may be formed in a rectangular shape and defined by edges arranged orthogonally and disposed in parallel with an interior surface 462a (FIG. 5) of the frame 462.

Figure 12:
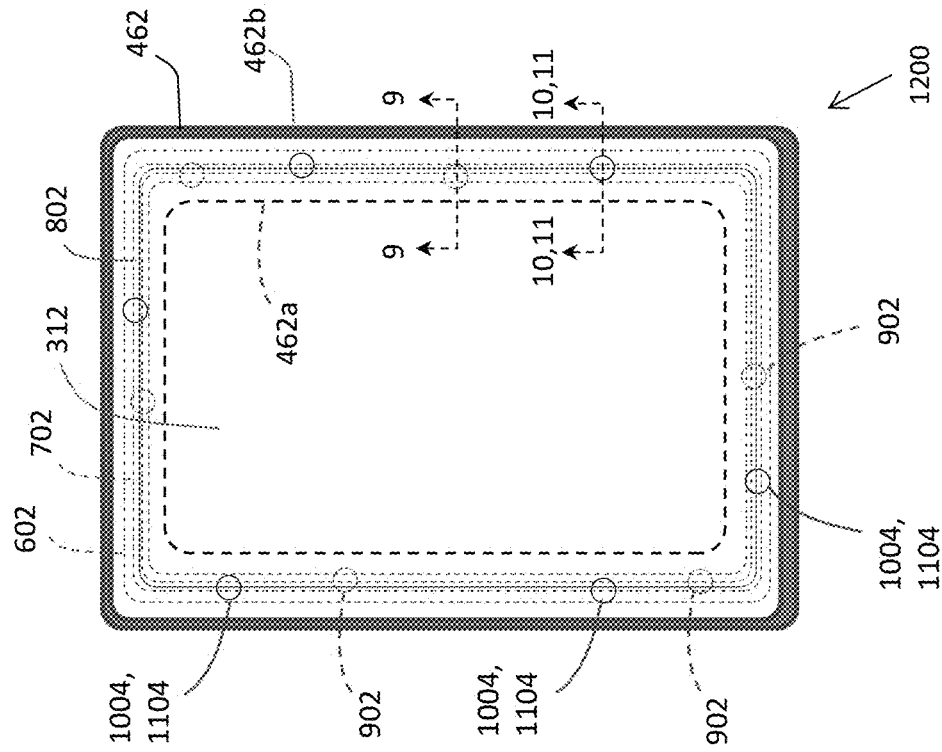
FIG. 12 is a top view of several embodiments of a DR detector housing assembly.

With reference to the embodiments of FIGS. 5-11, various methods and apparatus will now be described for assembling the housing of the DR detector embodiment 480 as shown in FIG. 4B. With reference to the assembly embodiment 500 of FIG. 5, there is illustrated in schematic form an exemplary cross-section view along section 5-5 of the exemplary embodiment of the DR detector 300 (FIG. 3). The DR detector frame 462 is formed to include a top notch 563 forming a corner of substantially 90° to receive a corner, of substantially 90°, of top cover 312, similar in certain respects to a corner lap joint. Vertical notch surface, or shoulder, 567 is configured to abut, or to be slightly spaced apart from, vertical edge 568 of top cover 312. Horizontal notch surface 569 is configured to abut the bottom surface 570 of top cover 312. A bonding agent or adhesive is used to affix, or secure, the top cover 312 to the frame 462 when the top cover 312 is pressed against the frame 462 such that the bottom surface 570 of the top cover 312 abuts the horizontal notch surface 569. The bottom cover 464 may be attached to a bottom notch 565 of frame 462 in a similar fashion as just described. The entire bottom surface 570 of top cover 312 may be covered with an aluminum sheet 566, extending to the edge 568 of the top cover 312, which, in one embodiment, may be formed as a thin aluminum foil. Frame 462 includes an interior surface 462a and an opposite exterior surface 462b. The overall shaped of frame 462 may be formed as a rectangle. The top and bottom covers 312, 464, may be similarly shaped as rectangles to seat in the notches 563, 565, respectively. As used herein, the terms "vertical" and "horizontal" refer to the orientations of the assemblies as illustrated in the several figures. FIG. 12 illustrates an exemplary top view of the detector embodiments 480, as described hereinbelow.

With reference to the embodiment 600 of FIG. 6, there is illustrated an alternative assembly embodiment to the assembly embodiment 500 of FIG. 5. A groove 602 is formed on the horizontal notch surface 569 of frame 462. The groove 602 extends linearly, parallel to the interior surface 462a of frame 462 (FIG. 12). The groove 602 is configured so that the top cover 312 bridges the groove 602. The groove 602 contains a bonding agent or adhesive to affix, or secure, the top cover 312 to the frame 462. The bonding agent, or adhesive, in groove 602 contacts both the frame 462 and the top cover 312 when the top cover is pressed against the frame 462 such that the bottom surface 570 of the top cover 312 abuts the horizontal notch surface 569. The bottom cover 464 may be attached to the bottom notch 565 of frame 462 using a groove 603 in a similar fashion as just described.

Figure 7:
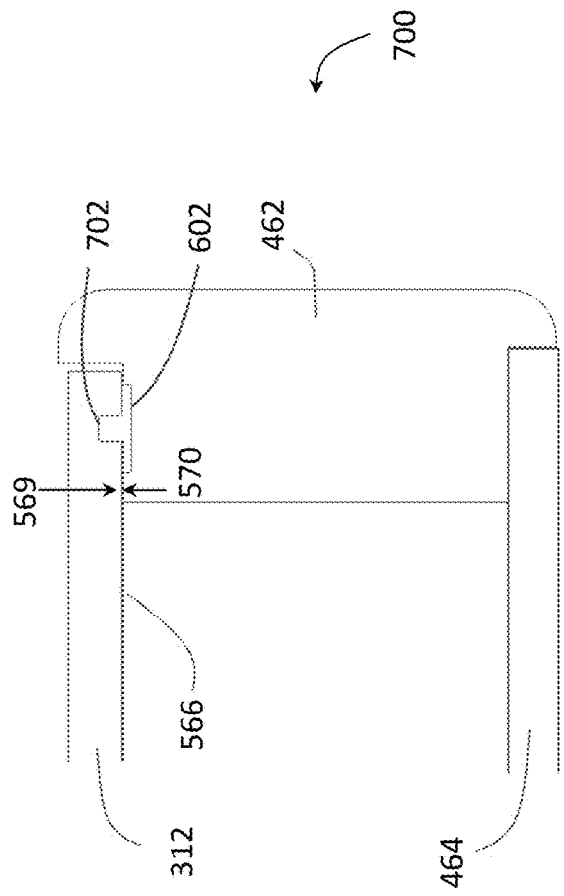
FIG. 7 is an exemplary schematic diagram showing another embodiment of a DR detector housing assembly.

With reference to the embodiment 700 of FIG. 7, there is illustrated an alternative assembly embodiment to the assembly embodiment 600 of FIG. 6. A groove 702 is formed in the bottom surface 570 of the top cover 312, which groove 702 directly faces a central region of the groove 602 in frame 462. The groove 702 extends linearly, parallel to the groove 602. The grooves 602, 702 contain a bonding agent or adhesive to affix, or secure, the top cover 312 to the frame 462. The bonding agent, or adhesive, in grooves 602, 702, contact both the frame 462 and the top cover 312 when the top cover is pressed against the frame 462 such that the bottom surface 570 of the top cover 312 abuts the horizontal notch surface 569. The aluminum layer 566 on the bottom surface 570 of the top cover 312 may extend only to an interior side of the top cover groove 702 and not to the edge of the top cover 312. The bottom cover 464 may be attached to the bottom notch 565 of frame 462 (not illustrated) in a similar fashion as just described.

Figure 8:
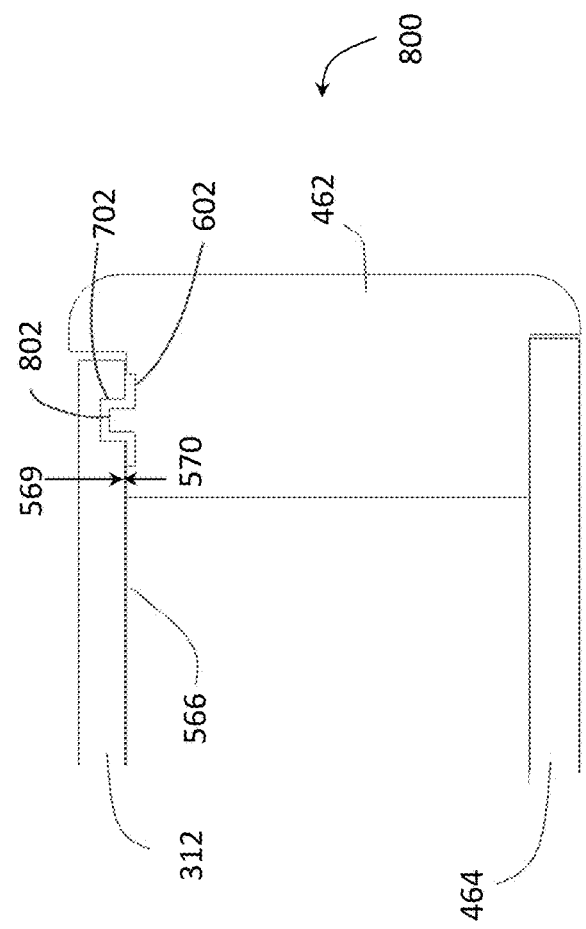
FIG. 8 is an exemplary schematic diagram showing another embodiment of a DR detector housing assembly.

With reference to the embodiment 800 of FIG. 8, there is illustrated an alternative assembly embodiment to the assembly embodiment 700 of FIG. 7. A raised central portion, such as a rib or ridge, 802 is formed down the middle of frame groove 602. The raised central portion 802 extends from the bottom of frame groove 602 upward above the plane of the horizontal notch surface 569 into the top cover groove 702, but the raised central portion 802 does not abut or contact the top cover 312. This leaves a space between the frame groove 602, the top cover groove 702 and the raised central ridge 802 for a bonding agent or adhesive to be disposed therein. The bonding agent, or adhesive, affixes, or secures, the top cover 312 to the frame 462. The bonding agent, or adhesive, in the space between the frame groove 602, the top cover groove 702 and the raised central ridge 802 contacts both the frame 462 and the top cover 312 when the top cover is pressed against the frame 462 such that the bottom surface 570 of the top cover 312 abuts the horizontal notch surface 569. The aluminum layer 566 on the bottom surface 570 of the top cover 312 may extend only to an interior side of the top cover groove 702 and not to the edge of the top cover 312. The bottom cover 464 may be attached to the bottom notch 565 of frame 462 (not illustrated) in a similar fashion as just described.

Figure 9:
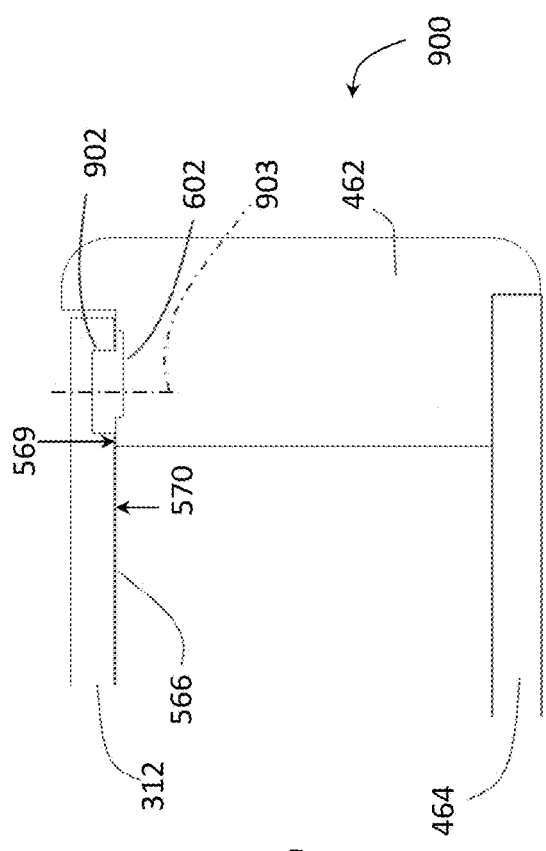
FIG. 9 is an exemplary schematic diagram showing another embodiment of a DR detector housing assembly.

With reference to the embodiment 900 of FIG. 9, there is illustrated an alternative assembly embodiment to the assembly embodiment 600 of FIG. 6, in schematic form, using an exemplary cross-section view along section 9-9 of the exemplary embodiment of the DR detector 1200 (FIG. 12). A number of circular recesses 902 are formed in the bottom surface 570 of the top cover 312, which recesses 902 directly face and overlap the groove 602 in frame 462. The circular recesses 902 each have a vertical central axis 903 which intersects a bottom of the frame groove 602. The circular recesses 902 and the frame groove 602 contain a bonding agent or adhesive to affix, or secure, the top cover 312 to the frame 462. The bonding agent, or adhesive, in circular recesses 902 and groove 602 contact both the frame 462 and the top cover 312 when the top cover is pressed against the frame 462 such that the bottom surface 570 of the top cover 312 abuts the horizontal notch surface 569. The bottom cover 464 may be attached to the bottom notch 565 of frame 462 (not illustrated) in a similar fashion as just described.

Figure 10:
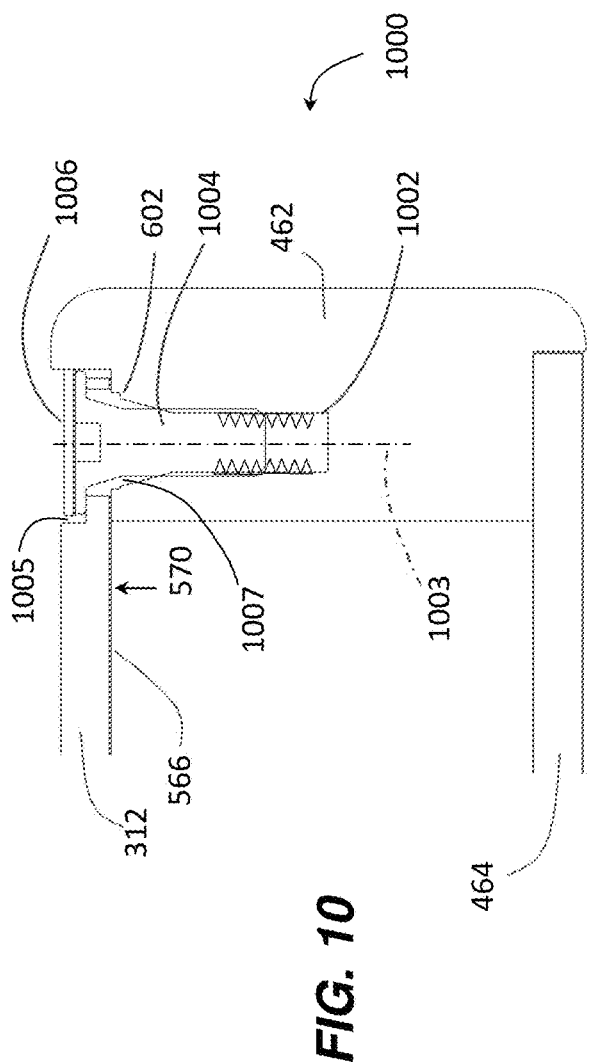
FIG. 10 is an exemplary schematic diagram showing another embodiment of a DR detector housing assembly.

With reference to the embodiment 1000 of FIG. 10, there is illustrated an alternative assembly embodiment to the assembly embodiment 500 of FIG. 5, in schematic form, using an exemplary cross-section view along section 10-10 of the exemplary embodiment of the DR detector 1200 (FIG. 12). A number of screw holes 1002 are formed partially through frame 462. The top cover 312 is counterbored a number of times such that the central axis 1003 of each counterbore 1005 in the top cover 312 is coaxial with a central axis 1003 of each screw hole 1002. A threaded screw 1004 may be inserted through the primary hole of each counterbore 1005 and seat on the shoulder thereof to attach the top cover 312 to the frame 462 when the screw 1004 is screwed into screw hole 1002. Each screw hole 1002 may also be threaded to engage the threaded screw 1004. In one embodiment, each screw hole 1002 may not be threaded but may be soft enough such that the screws 1004 may be self-threading. Each counterbore 1005, screw hole 1002, and screw 1004 may be shaped such that a gap 1007 therebetween allows a bonding agent or adhesive to be disposed therein, and in contact with the top cover 312, screw 1004 and frame 462, to more firmly attach and secure the top cover 312 to the frame 462. A sealing cap 1006 may be place over the head of the screw 1004 to prevent the bonding agent or adhesive from leaking through the counterbore 1005. The aluminum layer 566 on the bottom surface 570 of the top cover 312 may extend only to an interior edge of the counterbore 1005 and not to the exterior edge of the top cover 312. The bottom cover 464 may be attached to the bottom notch 565 of frame 462 (not illustrated) in a similar fashion as just described.

Figure 11:
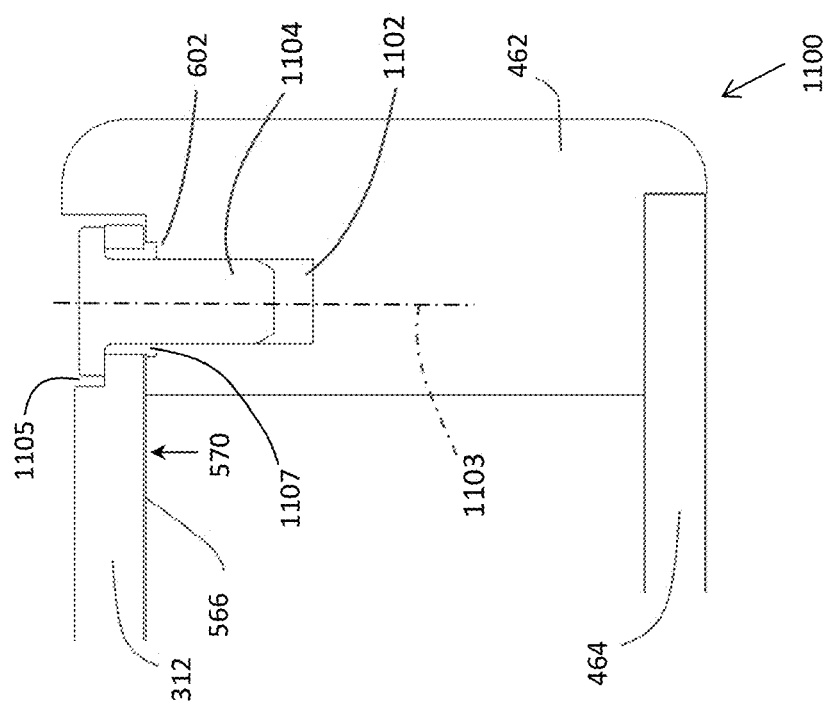
FIG. 11 is an exemplary schematic diagram showing another embodiment of a DR detector housing assembly.

With reference to the embodiment 1100 of FIG. 11, there is illustrated an alternative assembly embodiment to the assembly embodiment 1000 of FIG. 10, in schematic form, using an exemplary cross-section view along section 11-11 of the exemplary embodiment of the DR detector 1200 (FIG. 12). Instead of screws and screw holes, a number of pin holes 1102 are formed partially through frame 462. The top cover 312 is counterbored a number of times such that the central axis 1103 of each counterbore 1105 in the top cover 312 is coaxial with a central axis 1103 of each pin hole 1102. A pin 1104 may be inserted through the primary hole of each counterbore 1105 and seat on the shoulder thereof to attach the top cover 312 to the frame 462 when the pin 1104 is pressed into pin hole 1102. Each pin hole 1102 is sized to receive a press fitted pin 1104 to securely fasten the top cover 312 to the frame 462. In one embodiment, each pin hole 1102 may be soft enough such that the pins 1104 may be securely press-fitted therein. Each counterbore 1105, pin hole 1102, and pin 1104 may be shaped such that a gap 1107 therebetween allows a bonding agent or adhesive to be disposed therein, and in contact with the top cover 312, pin 1104 and frame 462, to more firmly attach and secure the top cover 312 to the frame 462. The aluminum layer 566 on the bottom surface 570 of the top cover 312 may extend only to an interior edge of the counterbore 1105 and not to the exterior edge of the top cover 312. The bottom cover 464 may be attached to the bottom notch 565 of frame 462 (not illustrated) in a similar fashion as just described.

As shown in the top view of FIG. 12, a DR detector embodiment 1200 illustrates the rectangular shaped frame 462 and the correspondingly shaped rectangular top cover 312 securely attached thereto as described herein. The frame 462 may be formed in a unitary fashion as a single piece aluminum frame or it may be formed in sections that are attached together. Several embodiments described herein are illustrated simultaneously in the top view of FIG. 12. The parts of FIG. 12 that are common to all embodiments include the rectangular frame 462 with interior surface 462*a* and exterior surface 462*b*, and the top cover 312. Embodiment 600 of FIG. 6 uses a frame groove 602 extending substantially parallel to interior and exterior surfaces 462*a*, 462*b*, respectively. Embodiment 700 of FIG. 7 uses frame groove 602 and a top cover groove 702 also extending substantially parallel to interior and exterior surfaces 462*a*, 462*b*, respectively. Embodiment 800 of FIG. 8 uses a frame groove 602, a top cover groove 702, and a raised ridge or rib shown as a solid line 802 in FIG. 12 also extending substantially parallel to interior and exterior surfaces 462*a*, 462*b*, respectively. Embodiment 900 of FIG. 9 uses a frame groove 602 and circular recesses 902, three (out of six) of which are enumerated in FIG. 12. Embodiments 1000 and 1100 of FIGS. 10 and 11, respectively, use screws 1004 and pins 1104, three (out of six) of which are enumerated in FIG. 12. Embodiments 1000 and 1100 may or may not include one or more of frame groove 602, a top cover groove 702, and a raised ridge or rib 802. The embodiments 1000 and 1100 in FIGS. 10 and 11, respectively, illustrate frame groove 602.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A DR detector comprising:
   a frame;
   a cover secured to the frame; and
   a frame groove formed in the frame, the groove having a bonding agent or adhesive therein for securing the cover to the frame,
   wherein the cover comprises a cover groove facing the frame groove, the cover groove parallel to and overlapping the frame groove, the cover groove having a bonding agent or adhesive therein for securing the cover to the frame,
   wherein the bonding agent or adhesive contacts both the frame and the cover,
   wherein the frame is made from aluminum and the cover is made from carbon fiber, wherein the frame groove includes a raised central portion that extends from a center of the frame groove into the cover groove, and wherein the raised central portion of the frame groove is spaced from an interior groove surface of the cover groove by a gap, and wherein the gap is filled with a bonding agent or adhesive.

2. The DR detector of claim 1, wherein the cover groove, the frame groove and the raised central portion are linear and are parallel to an outermost edge of the DR detector.

3. A digital radiographic (DR) detector comprising:
a multilayer structure including a two dimensional array of photosensors configured to capture radiographic images;
a rectangular frame having a top side, a bottom side, an inside surface and an outside surface;
a top cover secured to the top side of the frame;
a bottom cover secured to the bottom side of the frame, wherein the top cover, the bottom cover and the frame form an enclosure surrounding all sides of the multilayer structure, the inside surface of the frame faces the multilayer structure, and wherein the outside surface of the frame comprises an exterior edge of the detector;
a frame groove formed in the top side of the frame, the frame groove extending along the top side of the frame between the inside surface and the outside surface of the frame, the frame groove having a bonding agent therein for securing the top cover to the top side of the frame; and
a cover groove formed in the bottom side of the top cover, the cover groove extending around the bottom side of the top cover adjacent to an outer edge of the top cover, the cover groove facing the frame groove, the cover groove receiving the bonding agent therein for securing the top cover to the top side of the frame.

4. The DR detector of claim 3, wherein the cover groove is narrower than the frame groove.

5. The DR detector of claim 4, further comprising a conductive layer on the bottom side of the top cover, wherein a portion of the conductive layer that is adjacent to the cover groove faces a bottom of the frame groove.

6. The DR detector of claim 5, further comprising a raised rib extending from the bottom of the frame groove beyond the top surface of the frame and into the cover groove.

7. The DR detector of claim 3, further comprising a raised rib extending from the bottom of the frame groove beyond the top surface of the frame and into the cover groove.

8. The DR detector of claim 7, wherein the raised rib is formed along the entire length of the frame groove.

9. The DR detector of claim 8, wherein the raised rib is spaced from a groove surface of the cover groove by a gap, and wherein the gap comprises the bonding agent.

10. The DR detector of claim 7, wherein the cover groove, the frame groove and the raised rib are parallel to the outside surface of the frame.

11. A digital radiographic (DR) detector comprising:
a multilayer structure including a two dimensional array of photosensors configured to capture radiographic images;
a rectangular frame having a top side, a bottom side, an inside surface and an outside surface;
a top cover secured to the top side of the frame;
a bottom cover secured to the bottom side of the frame, wherein the top cover, the bottom cover and the frame form an enclosure surrounding all sides of the multilayer structure, the interior surface of the frame faces the multilayer structure, and wherein the outside surface of the frame comprises an exterior edge of the detector;
a frame groove formed in the top side of the frame, the frame groove extending along the top side of the frame between the inside surface and the outside surface of the frame, the frame groove having a bonding agent therein for securing the top cover to the top side of the frame; and
a plurality of circular recesses formed on the bottom side of the top cove, the circular recesses facing the frame groove and overlapping the frame groove, the circular recesses having the bonding agent therein in contact with the top cover for securing the top cover to the frame.

12. The DR detector of claim 11, wherein centers of each of the circular recesses are offset from a center of the frame groove.

13. The DR detector of claim 12, further comprising a conductive layer on the bottom side of the top cover, wherein a portion of the conductive layer that is adjacent to the circular recess faces a bottom of the frame groove.

14. The DR detector of claim 11, wherein the frame groove is parallel to the outside surface of the frame.

* * * * *